United States Patent
Ishiguchi

(10) Patent No.: US 8,238,723 B2
(45) Date of Patent: Aug. 7, 2012

(54) OPTICAL DISK RECORDING DEVICE

(75) Inventor: Fusao Ishiguchi, Daito (JP)

(73) Assignee: Funai Electric Co., Ltd., Osaka (JP)

( * ) Notice: Subject to any disclaimer, the term of this patent is extended or adjusted under 35 U.S.C. 154(b) by 1235 days.

(21) Appl. No.: 11/802,012

(22) Filed: May 18, 2007

(65) Prior Publication Data

US 2007/0269190 A1 Nov. 22, 2007

(30) Foreign Application Priority Data

May 19, 2006 (JP) ................................ 2006-140437

(51) Int. Cl.
*H04N 5/76* (2006.01)
*H04N 5/92* (2006.01)
*H04N 5/917* (2006.01)

(52) U.S. Cl. ........ 386/291; 386/294; 386/295; 386/326; 386/328

(58) Field of Classification Search .................. 386/291, 386/294, 295, 326, 328, 329
See application file for complete search history.

(56) References Cited

U.S. PATENT DOCUMENTS

2002/0141739 A1* 10/2002 Takahashi ..................... 386/111
2003/0235392 A1* 12/2003 Boston et al. .................. 386/46

FOREIGN PATENT DOCUMENTS

| JP | 08065616 | 3/1996 |
| JP | 09-284715 | 10/1997 |
| JP | 10-092106 | 4/1998 |
| JP | 10098683 | 4/1998 |
| JP | 11066661 | 3/1999 |
| JP | 2000030365 | 1/2000 |

* cited by examiner

*Primary Examiner* — Thai Tran
*Assistant Examiner* — Hung Dang
(74) *Attorney, Agent, or Firm* — Pillsbury Winthrop Shaw Pittman LLP

(57) ABSTRACT

A disk recording device includes an encoding unit, a control unit, and a structure which encodes a video signal in analog format and records it upon a DVD. Furthermore, the control unit includes a bit rate control unit which controls the bit rate during encoding by the encoding unit to any one of a plurality of video recording modes whose bit rates are different, a bit rate changeover control unit which selects one or more of these video recording modes and controls the timing of the changeover between them, and a ROM in which control data for the video recording mode is recorded in the format of a data table. The bit rate changeover control unit inputs the appointed time period for video recording the video signal, and the capacity which can be recorded upon the disk, and calculates the timing for the changeover between video recording modes.

2 Claims, 3 Drawing Sheets

| 931 | 932 | 933 | 934 |
|---|---|---|---|
| RECORDING MODE | RECORDING TIME [HOURS] | AVERAGE BIT RATE [BPS] | MAXIMUM BIT RATE [BPS] |
| XP | 1 | 9542 | 10080 |
| SP | 2 | 4771 | 6600 |
| LP | 4 | 2385 | 4200 |
| EP | 6 | 1593 | 1985 |

Fig.2

| RECORDING MODE | RECORDING TIME [HOURS] | AVERAGE BIT RATE [BPS] | MAXIMUM BIT RATE [BPS] |
|---|---|---|---|
| XP | 1 | 9542 | 10080 |
| SP | 2 | 4771 | 6600 |
| LP | 4 | 2385 | 4200 |
| EP | 6 | 1593 | 1985 |

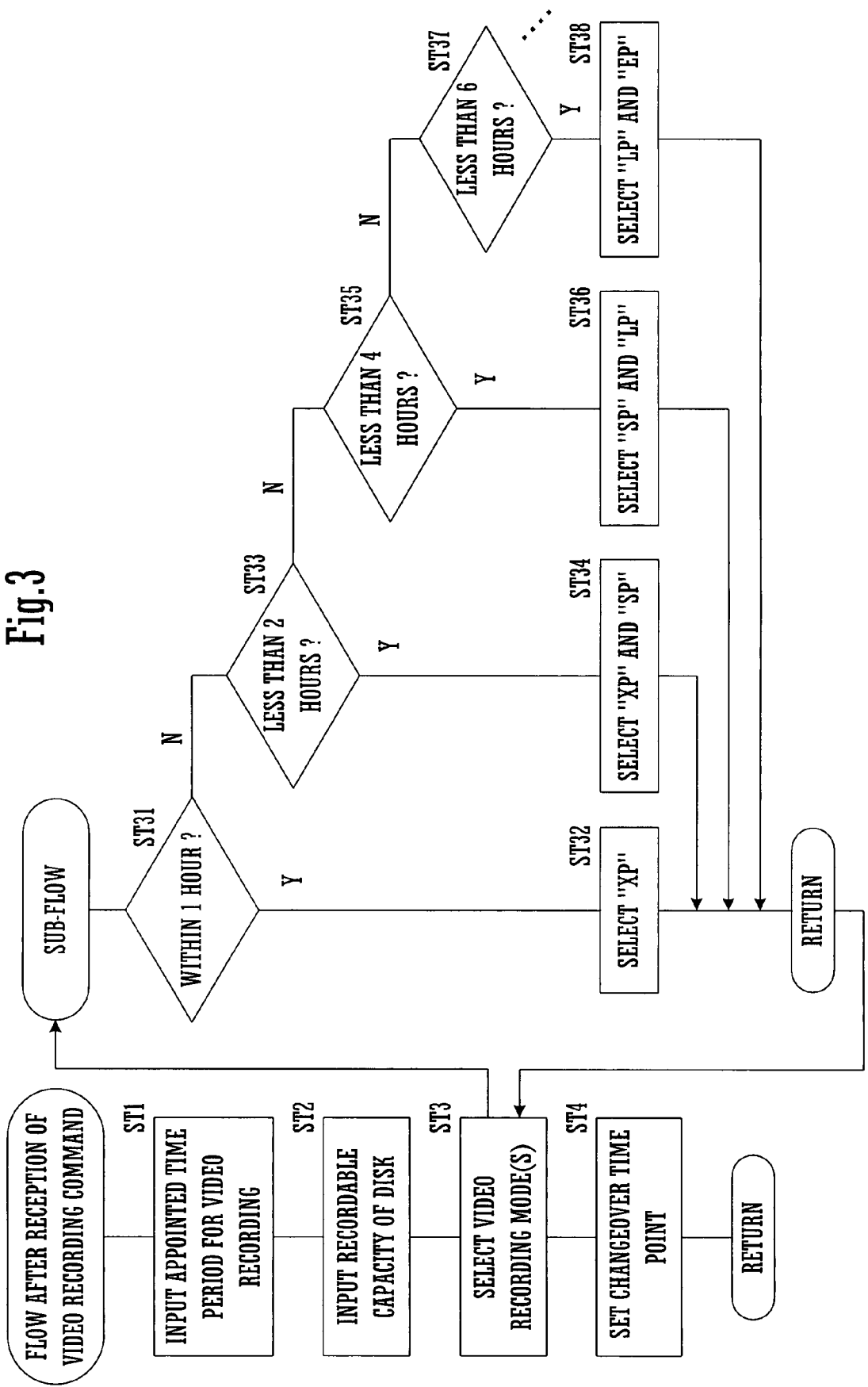

OPTICAL DISK RECORDING DEVICE

CROSS REFERENCE

This Nonprovisional application claims priority under 35 U.S.C. §119(a) on Patent Application No. 2006-140437 filed in Japan on May 19, 2006, the entire contents of which are hereby incorporated by reference.

BACKGROUND OF THE INVENTION

In the prior art, there has been implemented in practice a disk recording device which encodes a television broadcast in an analog format, or a video signal which has been recorded upon a VHS tape in an analog format, into a digital format, and records it upon a disk. As a user requirement for such a disk recording device, it is desired to perform video recording at as high a picture quality as possible, with the overriding stipulation that the contents which are desired to be video recorded upon the disk (in other words, for which it is desired to record a video signal upon the disk) should fit upon a single disk without overflowing therefrom. In order to meet this requirement, there has been disclosed (refer to Japanese Laid-Open Patent Publication Heisei 9-284715 and Japanese Laid-Open Patent Publication Heisei 10-92106) a disk recording device which, when performing video recording, sets the bit rate for encoding according to the picture quality and the video recording time period, and performs recording according to this bit rate. Furthermore, in the section "Background Art" of Japanese Laid-Open Patent Publication Heisei 9-284715, an implementation is described in which, during recording with a video tape recorder, the video recording is changed over, in time division, between a standard mode and an extended time video recording mode in which the picture quality is reduced.

However, with the techniques described in Japanese Laid-Open Patent Publication Heisei 9-284715 and Japanese Laid-Open Patent Publication Heisei 10-92106, it is not easy to set the bit rate individually according to the picture quality and the video recording time period, and there has been the problem that the program for performing this setting becomes complicated. In order to avoid this, in prior art devices, a plurality of bit rates are provided in steps. Since with prior art devices recording must be performed in one or the other of these video recording modes, accordingly sometimes recording has been performed at a bit rate reduced by one step (in other words, by reducing the picture quality), even if quite a large amount of space still remains upon the disk.

Furthermore, the embodiment of the VTR described in Japanese Laid-Open Patent Publication Heisei 9-284715, only offers a simple combination of two video recording modes, and no specific method of combining them is disclosed. But there may be a problem of poor picture quality, depending upon the way in which the two video recording modes are combined.

In consideration of this type of problem, the present invention takes it as its object to provide a disk recording device which enhances the picture quality during video recording, while employing a simple method of controlling the bit rate, and while preventing any spillage over from a single disk of the contents which are desired to be recorded.

SUMMARY OF THE INVENTION

The disk recording device according to the present invention includes an encoding means, a recording means, a bit rate control means, and a bit rate changeover control means.

The encoding means encodes a video signal in analog format, into a digital format The recording means records data encoded by the encoding means upon a disk which is loaded into the disk recording device.

The bit rate control means controls the bit rate during encoding by the encoding means to any one of a plurality of reference values which are determined in advance And the bit rate changeover control means calculates a uniform bit rate by dividing the capacity which can be recorded upon the disk by an appointed time period for video recording the video signal, combines upon the time axis one of the reference values which exceeds the uniform bit rate and one of the reference values which is less than or equal to the uniform bit rate, calculates a changeover timing between the selected reference values so as to occupy the capacity which can be recorded, and commands the bit rate control means to implement this changeover timing.

BRIEF DESCRIPTION OF THE DRAWINGS

FIG. 2 is an example of a data table referred to by a bit rate changeover control unit; and FIG. 3 is a flow chart showing the flow of processing performed by this bit rate changeover control unit upon receipt of a video recording reservation command (or of a video recording command).

DETAILED DESCRIPTION OF THE INVENTION

Figure 1:
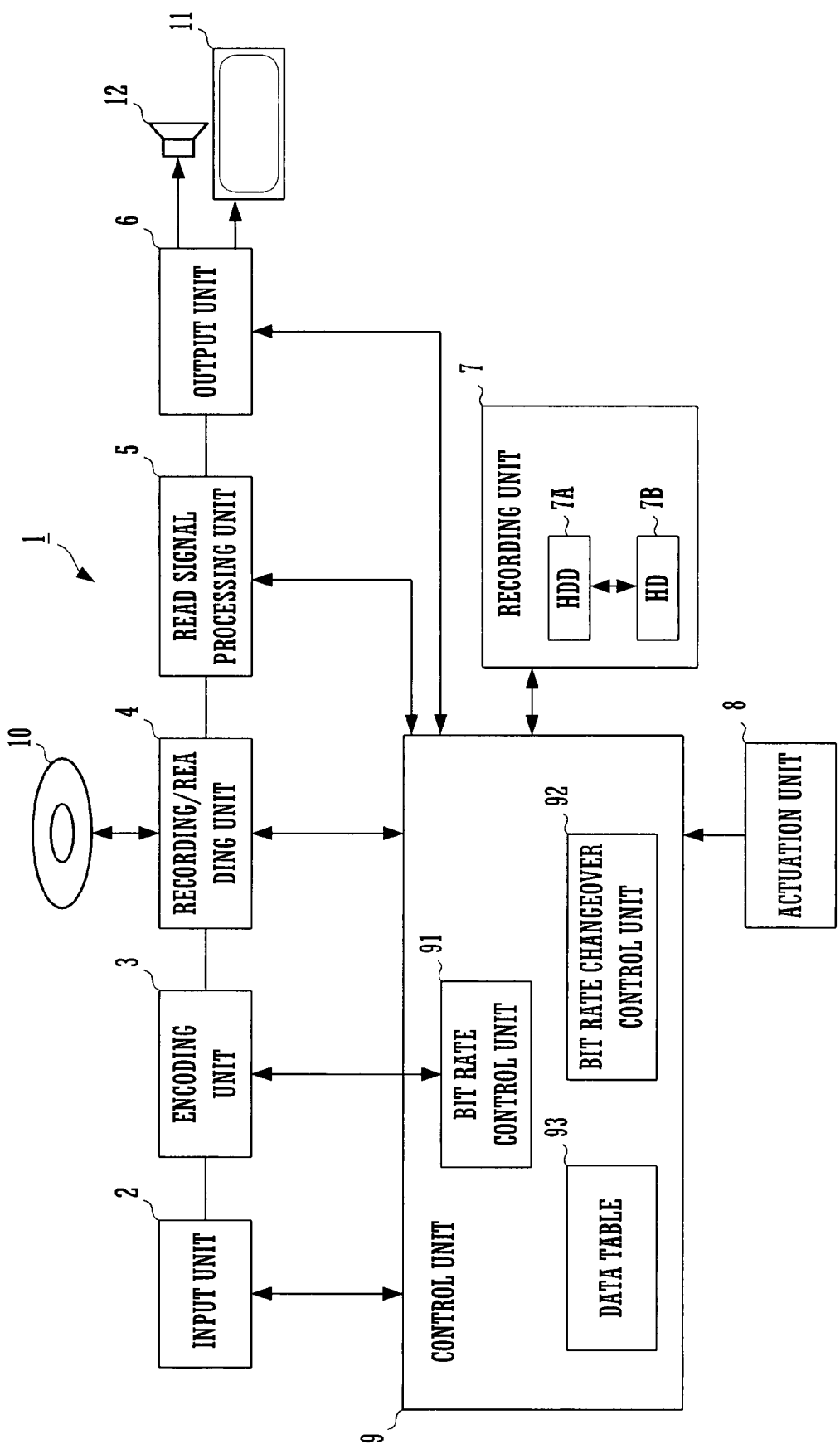
FIG. 1 is a block diagram showing the structure of the main portion of a DVD recorder.

FIG. 1 is a block diagram showing the structure of the main portion of a DVD recorder (denoted by the reference symbol 1 in the figure), which is an embodiment of the present invention. The DVD recorder 1 of this embodiment performs recording of a title upon a DVD (video recording) and replaying of a title which is recorded upon a DVD.

The DVD 10 which can be loaded to the DVD recorder 1 of this embodiment is a rewritable type DVD-RW optical disk or the like, or a DVD-R optical disk or the like; but the present invention is not limited to the DVD of this embodiment; this device can be applied to recording other types of optical disk as well.

A video signal and an audio signal in analog format are inputted to an input unit 2. For example, the video signal and an audio signal is a television broadcast signal in analog format received by an antenna (not shown in the figures). The video signal and an audio signal are also inputted from a VHS tape drive.

An encoding unit 3 converts the video signal and audio signal in analog format which have been inputted by the input unit 2 into digital signals, and encodes them, with its bit rate being controlled by a bit rate control unit 91. And the encoding unit 3 outputs this encoded data to a recording/reading unit 4.

The recording/reading unit 4 performs processing to record the data generated by the encoding unit 3 upon the DVD 10, processing to read out recorded data of a title which is recorded upon the DVD 10, and the like. The recording/reading unit 4 irradiates laser light upon the DVD 10, and comprises a servo control unit (not shown in the figures) which controls the irradiation position of this laser light irradiated upon the DVD 10 and tracking servo control and the like.

A read signal processing unit 5 extracts the image data and the audio data from the RF signal which has been read by the recording/reading unit 4, and decodes them. This read signal processing unit 5 D/A converts the image data and the audio data which have thus been decoded, and outputs the results to an output unit 6.

The output unit 6 outputs a replay signal based upon the recorded data which has been processed by the read signal processing unit 5. A display device 11 displays an image, and a speaker 12 emits audio. The display device 11 and the speaker 12 are connected to this output unit 6. And the output unit 6 outputs a replay video signal based upon the input data which has been inputted from the read signal processing unit 5, and a replay audio signal based upon the audio data, in mutual synchronization.

The recording unit 7 comprises a hard disk 7a (abbreviated as HD 7a) which is a recording medium, and a hard disk drive 7b (abbreviated as HDD 7b) which reads and writes this HD 7a; and the HDD 7b records the data which has been encoded by the encoding unit 3 upon the HD 7a.

An actuation unit 8 receives input actuation for the device main body. This actuation unit 8 comprises a plurality of actuation keys and a remote control reception unit which receives control codes for the device main body which have been transmitted from a remote control device not shown in the figures. The actuation unit 8 receives input corresponding to actuation keys which have been actuated by the user, and transmits codes corresponding to these, or control codes which it has received from the remote control reception unit, to a control unit 9. For example, the actuation unit 8 may receive input of a command for video recording (in other words, for recording of a video signal upon the DVD 10), or input of a command for making an appointment for video recording.

The control unit 9 comprises a CPU, a RAM, and a ROM for storing control data, and controls the operation of the various sections 3 through 8 in the device described above, based upon input received by the actuation unit 8. Furthermore, the control unit 9 includes a program which performs setting of a video recording appointment mode. According to the operation of this program, an appointed time period T (in hours) for video recording, an appointed time instant for video recording, and a television channel number for video recording are received, and an appointment for video recording is made. Furthermore, the control unit 9 comprises a bit rate control unit 91, a bit rate changeover control unit 92, and a data table 93.

The bit rate control unit 91 is constituted by a program recorded in the ROM. This bit rate control unit 91 controls the bit rate during encoding by the encoding unit 3, and keeps the average bit rate constant. And, as a control method, during its multi-stage video recording mode, the bit rate control unit 91 selects one of a large number of stages for the average bit rate, and changes over to one of these average bit rates.

The bit rate changeover control unit 92 is also constituted by a program recorded in the ROM. This bit rate changeover control unit 92, along with commanding the recording/reading unit 4 to acquire the remaining capacity of the DVD 10, also inputs the video recording time period which was received during the video recording appointment mode, and selects a video recording mode from the remaining capacity, the video recording time period, and so on, and commands the bit rate control unit 91 to change over the video recording mode.

The data table 93 is stored in the ROM as control data. This data table 93 is a data structure in which the titles of the video recording modes, the recording times available therein, and the average values of the bit rate controlled by the bit rate changeover control unit 92 are kept in mutual correspondence. This data structure is referred to by the bit rate control unit 91 and the bit rate changeover control unit 92.

The display device 11 and the speaker 12 are provided externally to this DVD recorder 1. The display device 11 displays an image based upon the replay video signal which is inputted thereto. And the speaker 12 emits sound based upon the replay audio signal which is inputted thereto from the output unit 6.

Next, an example of the structure of the data table 93 which is referred to by the bit rate changeover control unit 92 will be explained using the example of this data table shown in FIG. 2. In each entry in this data table 93, a video recording mode 931, a recording time period 932, an average bit rate 933, a maximum bit rate 934, and the like are stored in mutual correspondence. For example, for the video recording mode 931 "XP", the recording time is 1 (hours), and the average bit rate is 9542 [bps] (bits per second).

The video recording mode 931 can be "XP", "SP", "LP", or "EP". The recording time 932 is the length of time (in hours) that recording can be performed upon a DVD 10 which is a blank disk. And the average bit rate 933 is the average value of the bit rate which is considered to be a control target for the bit rate control unit 91.

Moreover, the maximum bit rate 934 is a value which gives the maximum value for the bit rate. If the variations in the image which is inputted to the input unit 2 are large, the bit rate control unit 91 may raise the bit rate within the range defined by this maximum bit rate 934 according to the variations of the image, so that roughness in the picture quality does not become prominent. Furthermore, the bit rate control unit 91 controls the value of the bit rate within the range defined by the maximum bit rate 934, so that, on average, the value of the bit rate attains the average bit rate 933.

As shown in FIG. 2, the higher the entry for the video recording mode lies in its column in FIG. 2, the shorter the recording time 932 becomes, and the higher the average bit rate 933 becomes and the smoother the picture quality becomes, while the video recording time period becomes shorter. Conversely, the lower in its column the video recording mode entry lies, the smaller the average bit rate 933 becomes, the rougher the picture quality becomes, and the longer the recording time 932 becomes.

The flow of processing performed by the bit rate changeover control unit 92 upon reception of a video recording reservation command (or upon reception of a video recording command for starting video recording directly) will now be explained using the flow chart of FIG. 3.

<ST1>: According to a program of the control unit 9 for setting of a video recording appointment, not shown in the figures, input is received from the actuation unit 8 to the program of the bit rate changeover control unit 92 of an appointed time period for video recording T (hours).

<ST2>: The recording/reading unit 4 is commanded to acquire the remaining capacity upon the DVD 10 which can be recorded.

<ST3>: According to a sub-flow shown on the right side of the FIG. 3 flow chart, a plurality of video modes are selected (with the exception of the step ST32, in which only a single video recording mode is selected). Here, it is supposed that, as a requirement by the user of the DVD recorder 1, the contents which he desires to be video recorded are to be kept within a single DVD 10 without overflowing, and it is also supposed that it is a requirement to perform the video recording at as high a picture quality as possible. Due to this, in this sub-flow, the bit rate changeover control unit 92 selects the optimum combination of video recording modes, from the remaining capacity of the DVD 10 and the time period for video recording.

The sub-flow of the step ST3 will now be explained. This step ST3 is shown for the case in which the disk 10 is an empty (blank) disk. The video recording modes which are selected in the steps ST32, ST34, ST36, and ST38 below correspond to "XP", "SP", "LP", and "EP" for the video recording mode 931 shown in FIG. 2. Furthermore, the decision references for the appointed time period for video recording T in the steps ST31, ST33, ST35, and ST37 correspond to the recording times 1, 2, 4, and 6 (hours) of the recording time 932 corresponding to these modes "XP", "SP", "LP", and "EP".

<ST31, ST32>: In the step ST31, a decision is made as to whether the appointed time period for video recording T which was inputted in the step ST1 is less than or equal to one hour, and, if it is less than or equal to one hour (YES in the step ST31), then in the step ST32 "XP" is selected as the video recording mode, and this sub-flow terminates. If in the step ST31 the appointed time period for video recording T is greater than one hour (NO in the step ST31), then the flow of control is transferred to the step ST33.

<ST33, ST34>: In the step ST33, a decision is made as to whether the appointed time period for video recording T is less than or equal to two hours. If the appointed time period for video recording T is less than or equal to two hours (YES in the step ST33), then in the step ST34 "XP" and "SP" are selected as the video recording modes, and this sub-flow terminates. If in the step ST33 the appointed time period for video recording T is greater than two hours (NO in the step ST33), then the flow of control is transferred to the step ST35.

<ST35, ST36>: In the step ST35, a decision is made as to whether the appointed time period for video recording T is less than or equal to four hours. If the appointed time period for video recording T is less than or equal to four hours (YES in the step ST35), then in the step ST36 "SP" and "LP" are selected as the video recording modes, and this sub-flow terminates. If in the step ST35 the appointed time period for video recording T is greater than four hours (NO in the step ST35), then the flow of control is transferred to the step ST37.

<ST37, ST38>: In the step ST37, a decision is made as to whether the appointed time period for video recording T is less than or equal to six hours. If the appointed time period for video recording T is less than or equal to six hours (YES in the step ST37), then in the step ST38 "LP" and "EP" are selected as the video recording modes, and this sub-flow terminates. If in the step ST37 the appointed time period for video recording T is greater than six hours (NO in the step ST37), then, by a program flow branch not shown in the figures, a video signal to the effect that video recording is not possible may be outputted upon the display device 11; or, as another method, it would also be acceptable to set a video recording mode whose bit rate is yet lower, and to utilize a combination of this video recording mode and "EP".

To summarize this sub-flow of the step ST3 described above, if the appointed time period for video recording T is less than some decision reference, then it is possible to combine the video recording mode which corresponds to the recording time of that decision reference, with a video recording mode whose picture quality is higher, and whose bit rate is higher than that of, that video recording mode.

<ST4>: If, as in the step ST34, ST36, or ST38, a plurality of video recording modes have been selected, then a time point for changing over the video recording mode is calculated. When starting the video recording, recording is started in that selected video recording mode whose bit rate is the higher, and subsequently the bit rate changeover control unit 92 changes over to that video recording mode whose bit rate is the lower, partway through the recording process. For example, if the appointed time period for video recording T=1.5 (hours), then the flow of control branches to the step ST34, and the video recording modes "XP" and "SP" are selected. If the remaining capacity upon the disk is termed R (in bytes), the time period for recording in the "XP" mode is termed T1 (in hours), and the time period for recording in the "SP" mode is termed T2 (in hours), then, since the average bit rates 933 in FIG. 2 are 9542 in the "XP" mode and 4771 in the "SP" mode (in bits), accordingly it is possible to obtain the time periods T1 and T2 by solving the equations:

$$9542 \times 60 \times 60 \times T1 + 4771 \times 60 \times 60 \times T2 = R \times 8 \text{ [bits per byte]}$$

and $$T = T1 + T2$$

Since the bit rate changeover control unit 92 combines reference values of a plurality of bit rates upon the time axis in this manner, accordingly the time period for recording at high picture quality is increased, as compared to the case of a disk recording device which combines only reference values which are less than said uniform bit rate. Furthermore, since the bit rate control unit 91 controls the bit rate during encoding by the encoding unit 3 to any one of the plurality of reference values which are determined in advance (i.e. not steplessly), accordingly the control performed by the bit rate control means becomes simple. By the operation described above, it is possible to enhance the picture quality during video recording, while using a simple bit rate control method, and while keeping the contents for which it is desired to perform video recording within the confines of one disk without overflow occurring.

Additional explanation of the operation of the DVD recorder of this embodiment will now be provided.

Although, in the steps ST32, ST34, ST36, and ST38 of the sub-flow ST3, one or two video recording modes were selected as the video recording modes to be employed, it would also be acceptable to select three or more thereof. For example, if the video recording time period is less than four hours (Y in the step ST35), it would be possible, instead of performing the step ST36, as well as selecting the "LP" mode in which video recording can be performed for four hours, also to select a combination of the "XP" mode and the "SP" mode in which the bit rate is higher.

Furthermore, in the step ST3, in order reliably to fit in the appointed time period for video recording T, it would also be acceptable to set a predetermined margin α, to replace this T by T−α, and to apply this during the application of the selection of video recording mode.

Moreover it would also be acceptable, in the step ST4, for the bit rate changeover control unit 92 to perform this calculation for reliably fitting in the appointed time period for video monitoring T during the video recording at predetermined intervals, and thereby to perform monitoring so as determine the time instant for changing over the bit rate in a more accurate manner. Further, it would also be acceptable to set a predetermined margin β in this step ST4, to replace this T by T−β, and to calculate the time instant for changing over the video recording mode based thereupon.

Furthermore, if in the step ST35 of the sub-flow of ST3 the time period is exactly two hours, then, although "SP" and "LP" are selected in the step ST36, in this case, when the simultaneous equations shown for the step ST4 are solved, the time period for replaying at "LP" becomes zero, and all of the replay comes to be performed at "SP". Moreover, if in the step ST37 the time period is exactly four hours, then, although "LP" and "EP" are selected in the step ST4, when the simultaneous equations shown for the step ST4 are solved, the time period for replaying at "EP" becomes zero, and all of the replay comes to be performed at "LP".

Although, in the step ST4, the time instant for changing over the video recording mode from the higher bit rate recording mode to the lower bit rate recording mode was determined, it would also be acceptable to change over the video recording mode from the lower bit rate recording mode to the higher bit rate recording mode. In this case, it would be possible to perform video recording of the last scene, which typically constitutes the climax of a production, at the higher picture quality. Moreover, in this case, since the bit rate is changed over from the low bit rate mode to the high bit rate mode partway through, it is desirable to provide a relatively large margin α or β, so as reliably to fit in the entire appointed time period for video recording T upon the DVD.

Furthermore, as explained above, the selection of recording mode shown in FIG. 3 relates to the case in which the DVD 10 is blank. If the DVD 10 is not blank and its remaining capacity is limited, then the values of the time periods which correspond to the decision references of the steps ST31, ST33, ST35, and ST37 must be proportionally reduced by calculation.

The selection of recording mode selected by the flow of the steps ST31, ST33, ST35, and ST37 is equivalent to calculating time periods $Tn_1 \sim Tn_N$ (N is number of the recording modes), for each of the recording modes $M_1 \sim M_N$, by dividing the remaining capacity by the average bit rate 933, and selecting video recording modes $M_j$ and $M_k$; the video recording mode $M_j$ corresponds to a time period $Tn_k$ ($Tn_k$ is one of the time periods $Tn_1 \sim Tn_N$) being most closely to the appointed time period for video recording while being greater than the appointed time period for video recording; and the video recording mode $M_j$ corresponds to the time period $Tn_m$ ($Tn_m$ is one of the time periods $Tn_1 \sim Tn_N$ and is different from $Tn_j$) being closest to the appointed time period for video recording while being less than or equal to the appointed time period for video recording.

Moreover, in order to select the recording mode in the flow of the steps ST31, ST33, ST35, and ST37, it would also be acceptable to perform this decision by calculating a bit rate (It will be referred to as uniform bit rate in the embodiment of the present invention) by dividing the recordable capacity upon the disk by the appointed time period for video recording the video signal. For example, among the video recording modes 931, it would be acceptable to combine, upon the time axis, (A) the video recording mode corresponding to an average bit rate which is closest to this uniform bit rate while being greater than this uniform bit rate, and (B) the video recording mode corresponding to an average bit rate which is closest to this uniform bit rate while being less than or equal to said uniform bit rate. It should be understood that here, by "uniform bit rate", is meant the bit rate which is obtained by averaging the remaining capacity upon the disk over the entire appointed time period for video recording; and this is different from the average bit rates 933 of the various video recording modes. Moreover, this method is substantially equivalent to the decision reference of the step ST3 of FIG. 3. It should be understood that the average bit rates 933 correspond to the "reference values" of the Claims.

If the bit rate changeover control unit 92 combines a reference value which exceeds said uniform bit rate and a reference value which is less than said uniform bit rate upon the time axis in this manner, then the time period at which recording at a high picture quality is possible is increased, as compared to the case of a disk recording device which combines only reference values which are less than said uniform bit rate. Furthermore, since the timing for changeover of said reference values is calculated and the reference values are changed over, so as to remain within said recordable capacity, accordingly it is possible to increase the proportion of the time period at which it is possible to perform recording at the reference value which has a higher bit rate, while keeping said video signal within said capacity. In other words, it is possible to increase the proportion of the time period at which it is possible to perform recording at a high picture quality.

Moreover, as the reference values which are to be combined, it would also be acceptable to arrange to select those reference values whose bit rates are closest to the uniform bit rate. Here, "closest to the uniform bit rate" means that, if for example the bit rates to which by the bit rate control unit 91 can perform its control are in five stages, and if three reference values for bit rate are to be combined upon the time axis, then three bit rates are selected in order from the one which is closest to the uniform bit rate (however, including one bit rate which is larger and one bit rate which is smaller than the reference value of the bit rate). Furthermore, if it is supposed that the reference values of bit rate to be combined upon the time axis are two, then it means that those two are selected which are closest to one another while being above and below the uniform bit rate. If this is done then, along with being able to reduce the change of the picture quality when changing over the bit rate, also it is possible to enhance the balance of the picture quality over the entire video recording time period. Supposing that a reference value for bit rate relatively far from said uniform bit rate is selected for which the picture quality is high, then on the one hand the video recording time period for recording at this high picture quality becomes short, and on the other hand, the other reference value for bit rate which comes to be selected is much below said uniform bit rate, so that the change of the picture quality when changing over between these two bit rates becomes large, and the balance of picture quality over the entire video recording time period may become bad. If the reference values for bit rate which are closest to the average bit rate are selected in this manner, then it is possible to enhance the balance of the picture quality over the entire video recording time period.

With the DVD recorder 1 of this embodiment, it is not necessary to incorporate the hard disk 8a and the hard disk drive 8b, provided that a structure is incorporated which encodes the video signal in analog format and records it upon the DVD 10.

Moreover, when the bit rate changeover control means is allocating the appointed time period for video recording, it is desirable to set the lengths of the time periods which can be recorded at the bit rates of said plurality of reference values as the reference time periods; and it would also be acceptable to determine a constant or a proportion to become the margin, so that it is possible reliably to fit in the time period for video recording upon the DVD.

What is claimed is:
1. An optical disk recording device, comprising:
a data table in which a plurality of reference bit rates are stored;
encoding means which encodes a video signal in an analog format, into video data in a digital format by one of the reference bit rates stored in the data table;
recording means which records the video data encoded by the encoding means upon an optical disk which is loaded into the optical disk recording device; and
changeover timing calculating means which:

calculates a uniform bit rate by dividing the capacity which can be recorded upon the optical disk by an appointed time period for video recording the video signal;

combines, upon the time axis, a first reference bit rate which exceeds the uniform bit rate and is closest to the uniform bit rate and a second reference bit rate which is less than or equal to the uniform bit rate and is closest to the uniform bit rate, from among the reference bit rates stored in the data table; and calculates a changeover time period between the first reference bit rate and the second reference bit rate so as to occupy the capacity which can be recorded, wherein the encoding means:

encodes the video signal into the video data by the first reference bit rate or the second reference bit rate; and changes over between the first reference bit rate and the second reference bit rate at the changeover time period which is calculated by the changeover timing calculating means.

2. An optical disk recording device, comprising:

a data table in which a plurality of reference bit rates are stored;

encoding means which encodes a video signal in an analog format into video data in a digital format by one of the reference bit rates stored in the data table;

recording means which records the video data encoded by the encoding means upon an optical disk which is loaded into the optical disk recording device; and changeover timing calculating means which:

taking a reference bit rate which is one of the references bit rates which are determined in advance as $N_i$ (where $i=1 \sim N$), lengths of time periods over which recording can be performed for recordable capacity at the reference bit rate $N_i$ as being $Tn_i$ (where $i=1 \sim N$), and k and m as each being any of values $i=1 \sim N$, selects a reference bit rate $N_k$ which corresponds to a closest value $Tn_k$ to an appointed time period for video recording which is greater than or equal to the appointed time period for video recording, and a reference bit rate $N_m$ which corresponds to a closest value $Tn_m$ to the appointed time period for video recording which is less than the appointed time period for video recording, from among the reference bit rates stored in the data table; combines the reference bit rate $N_k$ and the reference bit rate $N_m$ upon the time axis; and calculates a changeover time period between the reference bit rate $N_k$ and the reference bit rate $N_m$, wherein the encoding means:

encodes the video signal into the video data by the reference bit rate $N_k$ or the reference bit rate $N_m$; and changes over between the reference bit rate $N_k$ and the reference bit rate $N_m$ at the changeover time period which is calculated by the changeover timing calculating means.

\* \* \* \* \*